(12) United States Patent
Kho

(10) Patent No.: US 8,938,220 B2
(45) Date of Patent: Jan. 20, 2015

(54) AUTOMATED SELECTION AND PRESENTATION OF PERTINENT CONTACTS

(75) Inventor: Nancy Ellen Kho, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 13/540,769

(22) Filed: Jul. 3, 2012

(65) Prior Publication Data

US 2014/0011481 A1 Jan. 9, 2014

(51) Int. Cl.
*H04W 4/00* (2009.01)
(52) U.S. Cl.
USPC ........................................ 455/414.1; 707/798
(58) Field of Classification Search
CPC .............. H04W 4/00; H04M 2250/60; H04M 1/72572; H04M 1/274583; H04M 1/274516; H04L 43/045
USPC ........... 455/414.1, 414.2, 418, 558, 466, 519, 455/405
See application file for complete search history.

(56) References Cited

U.S. PATENT DOCUMENTS

| | | |
|---|---|---|
| 2007/0135110 A1 | 6/2007 | Athale et al. |
| 2008/0311951 A1 * | 12/2008 | Camp et al. ................ 455/552.1 |
| 2010/0082693 A1 * | 4/2010 | Hugg et al. .................... 707/798 |
| 2010/0148954 A1 | 6/2010 | Bobier |
| 2011/0092227 A1 | 4/2011 | Pjukan |

OTHER PUBLICATIONS

Wilairat W., et al. Smart At-A-Glance Contact List for Phone, Ip.com, IPCOM000177373D, Dec. 10, 2008.

* cited by examiner

*Primary Examiner* — Kashif Siddiqui
(74) *Attorney, Agent, or Firm* — Grasso PLLC; Fred Grasso

(57) ABSTRACT

A system for automatic selection and presentation of pertinent contacts having a mobile communication device, a plurality of information sources and an application operating based on a method of automatic selection and presentation of pertinent contacts. When a user attempts to establish a connection with a person, the method provides a prioritized list of suggested pertinent contacts that the user is likely to want to call. The method combines information from the plurality of information sources to suggest a plurality of appropriate contacts to be contacted. The application analyses a multitude of information including current context, calendar information, past call history, information from social network/social networking application, current time, location, any information from the navigational tool running on the mobile communication device, publicly available information etc to suggest a plurality of appropriate contacts to the user.

20 Claims, 4 Drawing Sheets

AUTOMATED SELECTION AND PRESENTATION OF PERTINENT CONTACTS

BACKGROUND

The field of invention relates to methods and systems for suggesting and organizing contact lists in mobile communication devices. More specifically, the field includes methods of, devices for, and systems for displaying an organized dynamic contact listing based on information pulled from different kinds of services.

In mobile communication devices when a user wants to call someone, the user has to scroll through a contact list to find the person who he or she wants to call, before placing the call. In some instances, speed dial and voice recognition facilities present in the conventional mobile communication devices can save time by allowing quick selection of a contact from an existing contact list.

Communication applications and services can employ a variety of mechanisms to maintain contacts. These mechanisms can be managed manually by the end user and can be complicated and cumbersome to maintain over different services. Contact lists in systems using these methodologies may become very long and difficult to manage. In some cases the contacts added to a contact list may be categorized into different groups, resulting in overlapping members of group memberships. As a result, the end users have to work through these complicated and long contact lists and may need to devote significant amounts of time for managing these contacts.

BRIEF SUMMARY

Devices, systems, processes, and articles of manufacture are provided herein. In embodiments, organizing contacts in a mobile communication device in a manner to suggest the preferred contact that a user may likely desire to contact by taking into account different factors including, the current context, using information from user's calendar, past call history, social network/social networking application, current time, location, information from available navigational tools including GPS running on the user's phone, status information of friends and/or self on messaging applications and publicly available information. Embodiments may further provide a prioritized list of suggested people to call and may allow the user to easily select a person to call with the press of one or more buttons or by touching the screen, or through voice commands on a mobile communication device.

Embodiments may include a system for automatic selection and presentation of pertinent contacts. The system may include a mobile communication device having network connectivity, a network for communicating the mobile communication device with a plurality of information sources. The system may also include an application operation based on a method of automatic selection and presentation of pertinent contacts. For example, when a user attempts to establish a connection with a person through the mobile communication device, the method may suggest a plurality of appropriate contacts that the user is likely to want to call. The suggested contact may be organized to form a prioritized list. These contacts may or may not be present in the contact list stored in the mobile communication device. Still further, the method may combine information from the plurality of information sources to suggest the plurality of appropriate contacts to be contacted.

In a preferred embodiment, a call suggesting module of the application may analyze a multitude of information including current context, calendar information, past call history, information from social network/social networking application, current time, location, any information from the navigational tool running on the mobile communication device and other publicly available information. The method may suggest a plurality of appropriate contacts to be communicated by the user. A prioritized list of suggested contacts to call may appear and the user can easily select a person to call with the press of one button or by touching the screen or through voice command Embodiments may include providing a method for automatic selection and presentation of pertinent contacts in a mobile communication device. Embodiments may also provide a plurality of contacts suggested by a call suggesting module of an application present in a mobile communication device. Embodiments may further provide a method for suggesting a prioritized list of a plurality of appropriate contacts by processing a combination of a plurality of information received from a plurality of sources.

Still further, embodiments may provide a prioritized list of a plurality of appropriate contacts that a user is likely to be contacted. And, embodiments may provide a plurality of contacts for a user to call who are not in the user's direct social network or contact list.

Embodiments may further employ modern communication systems involving dynamically generating contact lists based on the geographic location of a mobile computing device. Still further embodiments may include organizing a contact list by filtering a user's existing contact list based on the geographic location of the caller and the contacts. The geographic location of the contacts can be determined based on the physical location of the phone determined by global positioning system (GPS) and/or any address information stored in the contact's profile. Embodiments may also further prioritize contacts and take into account other context including calendar events, status of the users and contacts, locations that have been "checked-into" regardless of physical location of the phone, mutual friends, current time and past call history.

Thus, embodiments may organize or present contact lists that take into account the social network status of each contact. This may include assigning a social network weight to each contact based on the amount and type of interactions in a social network by each contact. The contact list may be further ordered based on the total weight obtained by each contact. Additional weighting may also be provided in addition to the social network weighting. These additional or alternative weightings can include the location of the user, where the user is going and/or the current status of the user. Still further, when the list is created or displayed, lists beyond those available in any present contact list or social network may also be used.

Another embodiment may manage the contact list based on preparing a smart call list that may deal with an existing static call list, where all the numbers of each of the persons on the list is called. In these embodiments, multiple numbers of each person may be ranked based on the current time and the frequency of calls, success of calls, etc, and based on the rank of each number the best reach for a particular person is figured out. If a person cannot be reached at the first number, the next best number may be dialed based on the rank. Since a smart call list may be unable to help the user find the best person to call, embodiments may also suggest the best contact for a single person to call based on past history, when, for example, seeking to efficiently call people when everyone in a call list/call tree must be called.

These and other advantages and features of the present invention are described with specificity so as to make the present invention understandable to one of ordinary skill in the art.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESRIPTION

Embodiments can provide a method for suggesting and organizing lists in a mobile communication device. Such a method can display an organized list of suggested contacts to a user based on information pulled from different kinds of services.

Embodiments may provide contact management to provide a user likely or preferred contact(s) a user may wish to make for a given situation. In so doing, a user may benefit by minimizing the need for manually maintaining a favorites list. Embodiments may serve to rank current contacts and list the top contacts based on various factors. These factors may include the user's location, calendar information, past call history, call duration, number of calls, accepting/rejecting calls, text messages sent and other recorded actions like the number of times the user opened the contact information for embodiments may also take into account the user's meetings, based on which the people who are in the same meeting is ranked higher. Embodiments may suggest people the user may want to call based on the user's context even when some of those people may not be listed as a contact on the user's mobile device. Embodiments may also take into account many factors including the destination of the user while a user is in-transit, status of the users and other users, locations that have been "checked-into" regardless of physical location of the phone and mutual friends indicated in a social network.

Figure 1:
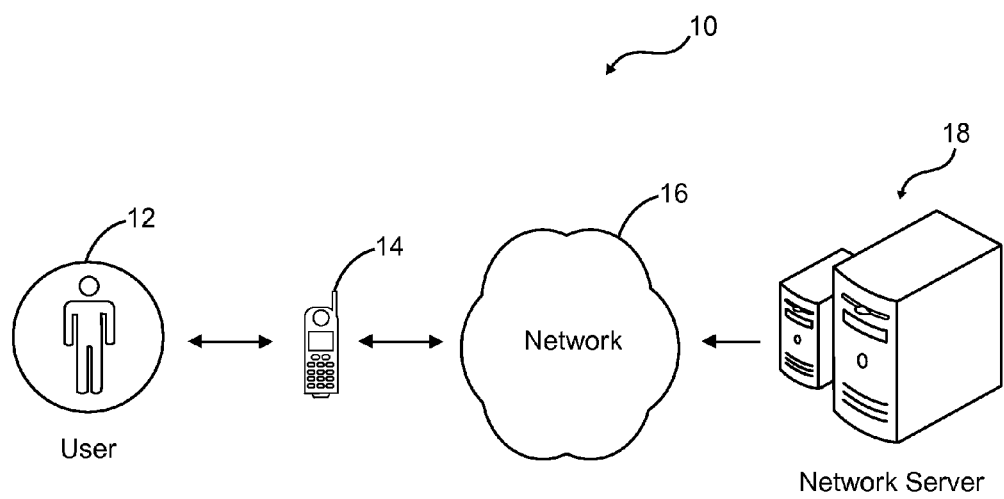
FIG. 1 is a conceptual diagram of the present invention illustrating a system for automatic selection and presentation of pertinent contacts in a mobile communication device.

FIG. 1 illustrates a system 10 for automatic selection and presentation of pertinent contacts in a mobile communication device 14. The system 10 is shown to include the mobile communication device 14, a user 12 operating the mobile communication device 14, and a network 16 for communicating with a plurality of information sources 18. Additional, different or fewer components may be provided and the communication methods may include wired and wireless methods. The mobile communication device 14 may be a smart phone or a tablet computer or any other electronic device capable of making contact with a person. The plurality of information sources 18 included in the system 10 may be able to communicate with the mobile communication device 14 through the network 16. When the user 12 tries to call a person from the mobile communication device 14, embodiments may suggest a plurality of appropriate contacts and may organize the suggestions to form a prioritized list. The proposed contacts may or may not be previously present in the contact list stored in the mobile communication device 14. Embodiments may suggest the prioritized list of appropriate contacts that the user 12 is likely to want to call or otherwise contact. The method combines information from the plurality of information sources 18 to suggest the plurality of appropriate contacts.

Embodiments may utilize any of the plurality of information sources 18 for obtaining information associated with calendar events, call history, call duration, social network information, current time, current location, GPS information and other publicly available information. From some or all of this gathered information, embodiments may suggest appropriate contacts and may sort them by a specified or determined priority as well as with a combination of information resident in the mobile communication device 14. The prioritized list of suggested contacts may be presented to the user 12 by displaying on a screen and/or through voice output in the mobile communication device 14. The prioritized list may or may not include contacts that are not stored in a contact list of the mobile communication device 14.

In embodiments, the user 12 can give commands to the mobile communication device 14 by a touch or pressing buttons or through voice activation. As to the priority of the list, a top contact in the suggested prioritized list may have a greater chance of establishing a successful communication than the subsequent contacts. Other display options may also be used. Still further, embodiments may also automatically contact one or more of the persons in the prioritized list, starting from the first contact, connecting recursively until a successful communication is made or until multiple contacts are made. The mobile communication device 14 may automatically select a next preferred contact to call from the suggested prioritized list whenever an attempt to connect with a current contact is unsuccessful.

Figure 2:
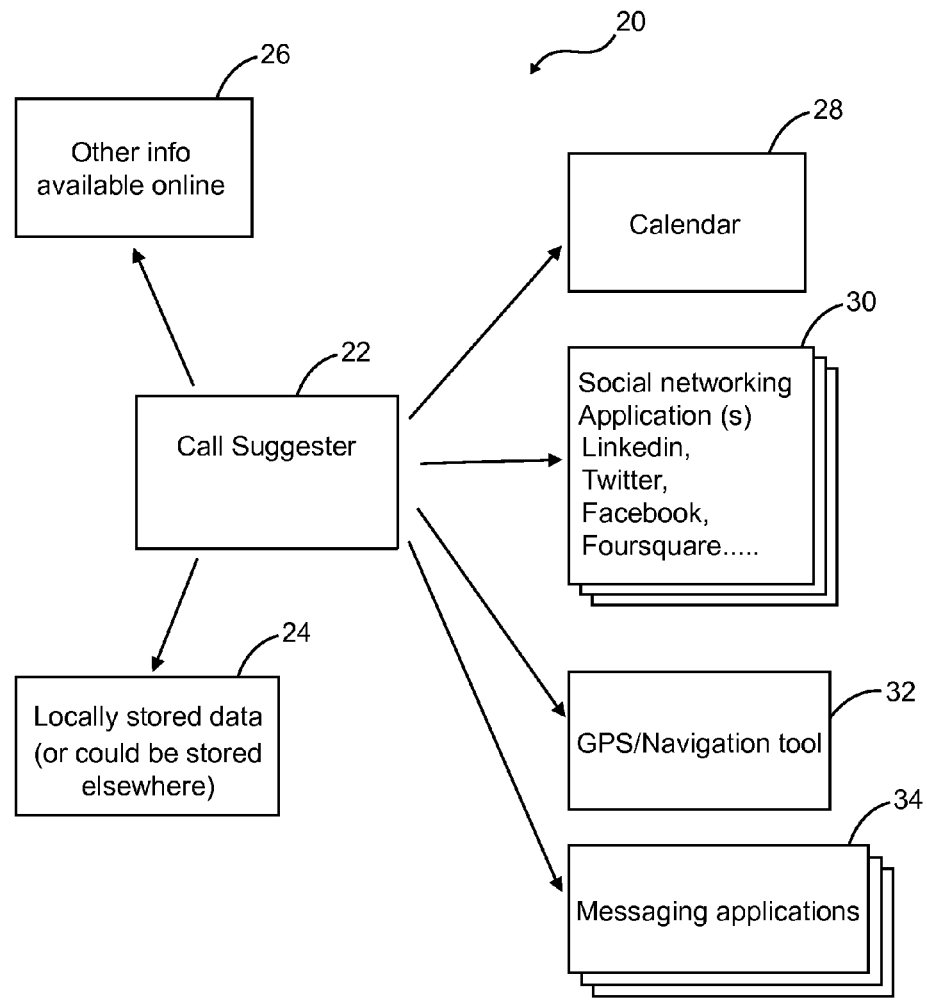
FIG. 2 is block diagram of the present invention illustrating different blocks for various software modules that may be running on the mobile communication device.

FIG. 2 illustrates a block diagram 20 with different blocks for various software modules that may be running in embodiments. The figure shows various applications and services that embodiments may access to gather information. FIG. 2 also shows examples of the types of information that may be collected from each application or module. The information being gathered may include outside information as well as information from the mobile communication device, such as the user's current context.

In embodiments, the call suggesting module 22 may collect information from different sources including information from locally stored data 24, information available online 26, calendar information 28, information from social networking applications 30, location information obtained from GPS or navigational tools 32 and information from other messaging applications 34.

In embodiments, the locally stored data 24 may include information about the current date, time, past call history etc. These data may be stored in the mobile communication device or in any other storage media accessible by the call suggesting module 22. The information available through online 26 may include a plurality of information sources including online directories, phone books, events information available publicly through online etc. The calendar information 28 may include previously set event's information, which may include event date, time, location, other persons who are invited to the same event, contact information of attendees and event coordinators etc. The information from social networking applications 30 may include a variety of information collected from social networking applications like LinkedIn, Twitter, Facebook, Foursquare etc.

From the social networking applications 30 a multitude of data can be gathered, which includes events information, "checked-in" status of different persons to a particular event, their "checked-in" locations, friend's contact information, mutual friend's info, status of friends etc. The location information of the user and the location where an event takes place or a destination place may be obtained from the navigational tool 32 present in the mobile communication device. Also the information from different messaging applications 34 (messenger, Google talk, skype etc.) include status, like location, mood, desires, plans etc, of friends, availability of friends etc. The information collected from the plurality of modules or applications are combined or processed by the application to suggest the appropriate contacts to make a call. Using the smartphones having applications employing the method of present invention, information from a multitude of applications, such as social networking tools or applications 30, calendars 28, navigation application 32, presence information etc. are used to make suggestions of people/phone numbers to call. The method of the present invention select/prioritize any number of factors including location, social network, calendar invite/event, status, etc to use for suggesting people/phone numbers to call. The application can be configured to ignore the information from any particular source at all times as set by the user. The user may also configure how to prioritize those factors. For example calendar information 28 can be prioritized higher than social networking applications' 30 status updates, actual location according to the phone GPS tracking application or navigational tool 32 can be prioritized higher than information from social networking application 30 etc. The user can select/prioritize factors to use for a specific time and the user can also set the number of people he wants to be suggested.

The plurality of information includes several scheduled information in the mobile communication device or social network events or any publicly known events where the user may want to attend. The method checks user's calendar and user's account from other sources (including facebook, evite, etc) to retrieve any event information to check whether the user is going to an event. If the user scheduled to attend the event then the user's current status is obtained from Twitter, Facebook, Instant messaging status, etc., the location of the user and the destination is found out using navigation software. The method may find potential people/other entities to suggest for a call. The method may also find people who are in the same situation as the user. Depending on the context, the method performs different actions including finding other people who may be attending the same event, finding people who may be going to the same location, finding people who may be in the same area, finding people who may know people who are attending the same event, finding people with a similar status as the user, finding phone number of event location that the user is going to attend the event etc.

In embodiments, the suggested contacts information may be selected to prepare the prioritized list based on additional information gathered. This additional information may be inclusive of whether the phone number of the location where the user is going to or the number of the organizer or of the person's house where the user is going to attend the event is a direct hit, how often has the user interacted with the other users or suggested contacts, how close is the user to the suggested person (Best friend, close friend, acquaintance—according to social networking application such as Facebook, Twitter, etc.), distance between the two people (that can be computed from other person's "checked-in" location, status info, GPS info, etc), source of information (the source of information is prioritized based on reliability/how often user uses a certain application/user preferences), availability of the suggested person, whether the suggested person invited and attending the event or just invited but not attending or knows someone who is attending/invited, and other call history information (such as time of previous calls placed with person) etc.

Still further, in embodiments, the method maps may identity the user in various directories/information stores to find the user's contact information (phone number) if necessary. Also the application may access other applications/previously saved information or locally saved data accessed from the mobile communication device or other applications, at any of the above steps. Some of the information may be gathered to determine the priority of a phone number that may have been collected earlier by the mobile communication device.

As one example, if Jack uses a smartphone enabled with the application that employs method of automatic selection of pertinent contacts and he is in a car driving to his/her friend Cindy's birthday party, and if he wants to call Cindy, or anyone else who is at the party, to let them know that he will be late, the application installed in his smartphone may suggest the best person(s) to contact by considering the plurality of information. Embodiments may serve to check his calendar to get information about the invitation and if the current time is close to an invite/event that he has accepted, embodiments may assume that he may be on his way to the party. A list of people to call may then be suggested, with Cindy being at the top of the list. Her number may be retrieved from the invitation and if the number is not provided with the invitation, embodiments may search for the number from Jack's phone book, or from her profile in social networking applications/sites (from Facebook or Google or other application). The other people suggested may include people who are also listed in the invite. People who are actually attending the event may be prioritized higher, and those that Jack has interacted with more/know better may also be prioritized higher. If someone on the list is on Jack's missed calls list, that person may also be prioritized higher.

As another related non-limiting example, considering another occasion if Jack lost his way while going to Cindy's house and needed directions, embodiments may serve to check calendar information and if nothing can be retrieved from the calendar information, embodiments may use destination addresses obtained from the navigational tool (GPS) running on his smartphone to map the address to his friend. Still further, Jack's friend may be listed at the top of the suggested list to call. Embodiments may also check Jack's social network and find mutual friends that Jack has, and list those people, prioritized by how well Jack knows them/how much he has interacted with them and their current status (those that unavailable are prioritized lower). If a friend cannot be reached, embodiments may automatically attempt to connect with the next prioritized contact.

Embodiments can keep track of the user's past calls and recognize the pattern of the user's calls over a period. Embodiments can suggest the same numbers to call that the user contacts at a particular instant every day, and give the remaining suggested contacts a lower priority. For example, if the user is travelling to a destination by enabling the navigation application, embodiments can interact with the navigation application to get contact information of the destination place. The contact information may be available in the navigation application or can be found through Google maps, online directories, etc.

Figure 3:
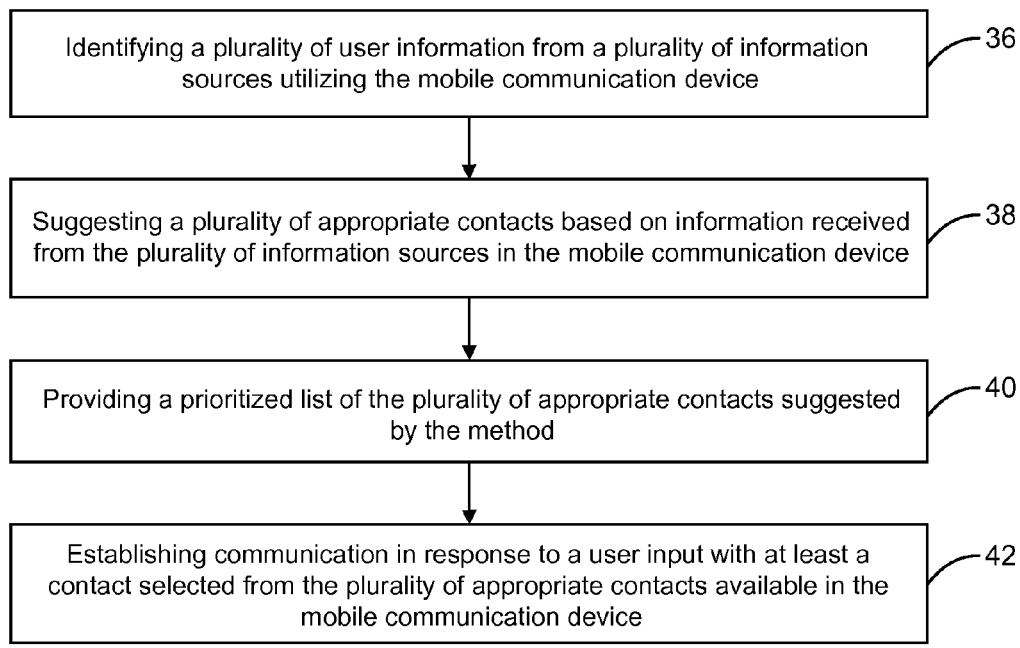
FIG. 3 is a flow chart illustrating a method for automatic selection and presentation of pertinent contacts in the mobile communication device.

FIG. 3 shows a flow chart illustrating a method for automatic selection and presentation of pertinent contacts in the mobile communication device. In embodiments, a user of the mobile communication device may intend to call someone and the mobile communication device may identify a plurality of user information from a plurality of information sources as shown in block 36. Based on context of the user's information obtained from the plurality of information sources or the mobile communication device or both, a plurality of appropriate contacts may be suggested as shown in block 38. At block 40, the plurality of appropriate contacts received in the mobile communication device may be sorted by analyzing information from a combination of information sources to provide a prioritized list.

Embodiments may serve to suggest appropriate contacts to be communicated with based upon the information received from different sources. These suggested contacts may be displayed on the screen of the mobile communication device and/or provided as audio output to the user. Then the user can select a person to call with the press of one button or by touching the screen. The phone could also read the choices for the user and the user can select his response by saying one of the choices. Upon receiving the command from the user the mobile communication device tries to establish a connection with a top contact from a plurality of appropriate suggested and made available in the mobile communication device as shown in block 42. If a successful connection is established with the suggested contact the method may wait for further user input. Otherwise the next best contact to be reached from the suggested list may be selected and used to automatically established connection with the contact. The iteration process continues till a successful connection is established or a user interrupt.

Figure 4:
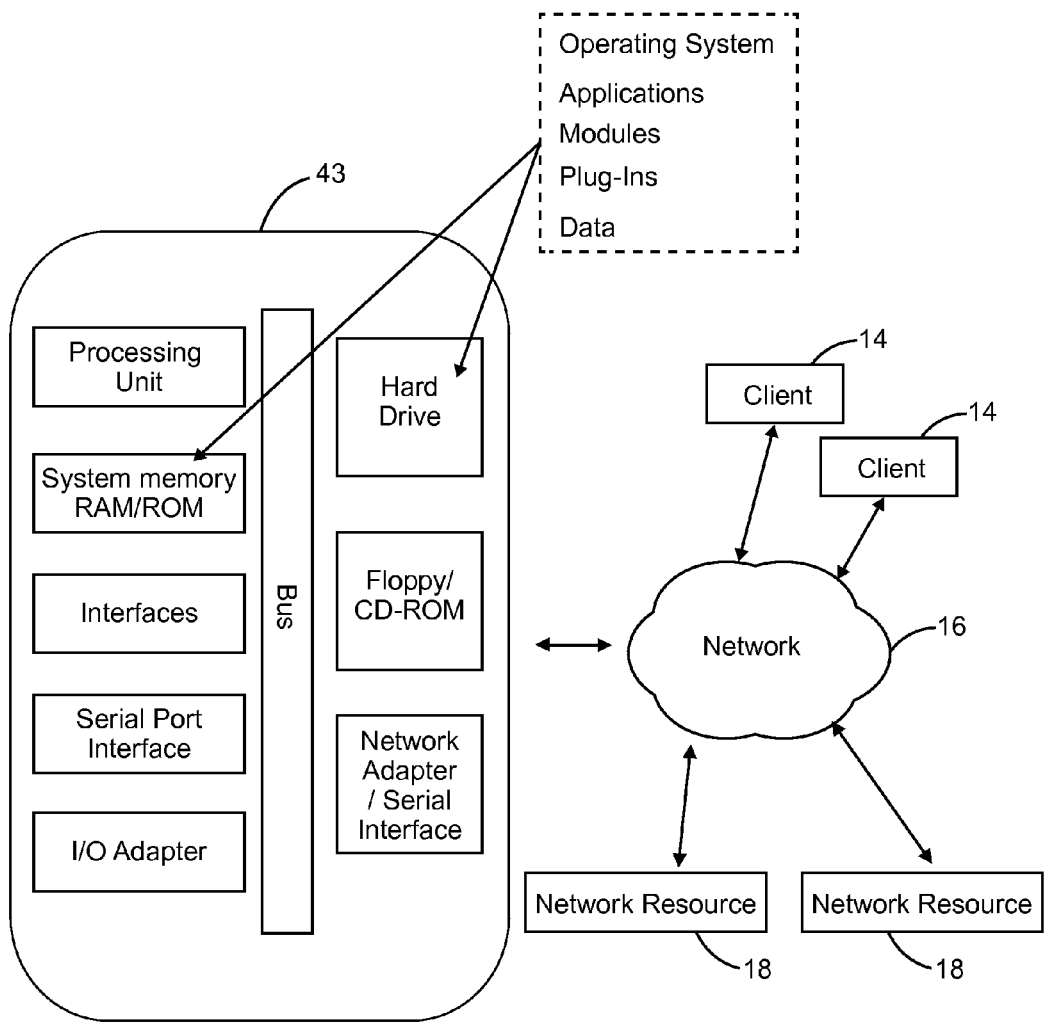
FIG. 4 is a schematic of a system employing a mobile communication device in communication with network resources over a network in accord with embodiments.

FIG. 4 is a schematic of a system employing a mobile communication device 43 in communication with network resources over a network in accord with embodiments. As can be seen, FIG. 4 contains a Mobile Communication Device 43, Clients 14, Network Resources 18, and a Network 16. The Mobile Communication Device 43 contains a processing unit, system memory, Interfaces, a Serial Port Interface, an I/O adapter, a hard drive, a floppy drive, and a network serial adapter. Each of these may be connected with and communicate over the bus. Stored on the hard drive and the system memory may be various software modules and code which include an operating system, applications, modules, various plug-ins and data. The Mobile Communication Device (MCD) 43 may be a personal tablet computer or other portable device. This MCD 43 may contain stored code, which when executed by the processor unit may carry out embodiments or portions of embodiments as described herein. The MCD 43 may communicate over the Network 16 to gather and receive information from Network Resources 18. The clients 14 may also be MCDs and may be in communication with the MCD 43 of FIG. 4. The clients 14 may contain some or all of the components and software code of the MCD 43 shown in FIG. 4.

While embodiments have been described in terms of a system, method and device, other embodiments are also possible. Further, while embodiments have been described in terms of methods for prioritizing the suggested contacts in the mobile communication device itself, other embodiments and functionality may also be possible. For example, some of the suggested contacts in each situation may be stored in a local storage or network for future comparison. Additionally, while embodiments have been described in terms of methods for prioritizing the suggested contacts in the mobile communication device, other embodiments may also be possible. For example, the prioritized list of suggested contacts may also or instead allow for a reorganizing by the user of the mobile communication device.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. A method for suggesting contacts in a mobile communication device, the method comprising the steps of:
 processing information sent over a network to a receiving mobile communication device from a first information service, the information being processed to identify one or more contacts at the mobile communication device, the information sent from the first information service responsive to,
  it considering context of the mobile communication device, and,
  it searching information sources other than a contact list of the mobile communication device for purposes of identifying potential contacts relevant to the context of the mobile communication device,
 processing information sent over a network to a receiving mobile communication device from a second information service, the information being processed to identify one or more contacts at the mobile communication device, the information sent from the second information service responsive to,
  it considering context of the mobile communication device, and,
  it searching information sources other than a contact list of the mobile communication device for purposes of identifying potential contacts relevant to the context of the mobile communication device,
 at the mobile communication device, using processed information from at least the first information service or the second information service to suggest a plurality of contacts responsive to context of the mobile communication device; and
 prioritizing contacts in the plurality of suggested contacts.

2. The method of claim 1 wherein there is a user associated with the mobile communication device and wherein the context of the mobile communication device includes information associated with user calendar information, call history, call duration, information from a plurality of social networks, current time, current location obtained from a navigational tool information in the mobile communication device, destination of the user, destination of the user while the user is in-transit, publicly available information relevant to the location of the mobile communication device, or publicly available information relevant to a calendar associated with the user.

3. The method of claim 1 wherein processed information is used from both the first information service and the second information service and one or more suggested contacts responsive to the context of the mobile communication device were not previously associated with the mobile communication device or a user associated with the mobile communication device.

4. The method of claim 1 wherein the context of the mobile communication device includes interrelated conditions in which the mobile communication device exists and these conditions include the location of the mobile communication device and the in-transit destination of the mobile communication device.

5. The method of claim 1 wherein the prioritized list of the plurality of appropriate contacts is presented to the user by displaying on a screen or through voice output in the mobile communication device and wherein a user's existing contact list is filtered based on the geographic location of the caller and the geographic location of the contacts.

6. The method of claim 1 wherein the prioritized contacts may include a plurality of contacts not listed in a contact list of the mobile communication device, and the plurality of contacts is extracted from the user's context based information.

7. The method of claim 1 wherein the mobile communication device is able to establish communication with a prioritized contact by a touch, pressing of a button or a voice command of a user and wherein the considered context of the receiving communication device comprises calendar events associated with the user of the mobile communication device or GPS location information of the mobile communication device.

8. The method of claim 1 wherein the mobile communication device has an internet connectivity for obtaining a user's current context, the context including social network associations, social network activities, scheduled events, status information of friends on messaging applications, publicly available information from online directories, publically available events information, or current location of the mobile communication device obtained from a navigational tool.

9. The method of claim 1 wherein prioritized contacts includes a first contact with a greater chance of establishing a successful communication with the user than a second contact.

10. The method of claim 1 wherein contacts after prioritization are selected, starting from a first contact, wherein the mobile communication device attempts a connection recursively with the first contact and then for successive selected contacts in prioritization order until a successful communication is made.

11. The method of claim 1 wherein the mobile communication device automatically selects a next contact to call whenever an attempt to connect with a current contact is unsuccessful.

12. A communication system for suggesting a plurality of pertinent contacts based on a plurality of information obtained from a plurality of information sources, the system comprising:
a mobile communication device including a display, an input, and a receiver for receiving a plurality of information over a network from a plurality of information sources;
an application configured in the mobile communication device to:
consider the plurality of information received from the plurality of information sources and suggest a plurality of contacts based on the plurality of information received from the plurality of information sources; and
provide a prioritized list of the plurality of contacts that the user is likely to contact
wherein the plurality of information is sent by the plurality of information sources in response to the present context of the mobile communication device and in response to searching information sources other than a contact list associated with the mobile communication device for purposes of identifying one or more contacts at the mobile communication device.

13. The communication system of claim 12, wherein the mobile communication device is also configured to suggest a phone number based on previous user calls at a particular instance on previous days.

14. The communication system of claim 12, wherein the application has a plurality of modules including a call suggesting module and a plurality of information gathering modules, and wherein the user can set configurations to ignore information from any particular source at all times.

15. The communication system of claim 12, wherein the application is further configured to organize a contact list by consider the geographic location of the user and the contacts.

16. The communication system of claim 12, wherein the plurality of contacts suggested include identification of contacts not previously associated with the user of the mobile communication device.

17. The communication system of claim 12, wherein the call suggesting module provides a prioritized list of the plurality of pertinent contacts to the user of the mobile communication device.

18. The communication system of claim 12, wherein the mobile communication device automatically establishes a connection to a contact of the prioritized list based on past history when seeking to call everyone on a phone tree.

19. A manufacture comprising:
a mobile communication device having a display, an input and a receiver for receiving a plurality of information from a network;
a data processing module for processing the plurality of information received from a plurality of modules of an application operating from the mobile communication device; and
a storage unit storing computer code, the computer code, which when executed by a processor of the mobile communication device, causes the processor to perform a method of automatic selection and presentation of pertinent contacts by:
suggesting a plurality of contacts based on information received from a plurality of information sources over a network, the information sent by the plurality of information sources after receiving and considering the present context of the mobile communication device;
providing a prioritized list of the plurality of suggested contacts; and
establishing communication in response to the user input with at least a contact selected from the plurality of contacts available in the mobile communication device;
wherein the plurality of contacts to be contacted are suggested by analyzing a combination of information received from the plurality of information sources other than a contact list associated with the mobile communication device.

20. The manufacture of claim 19 wherein the data processing module analyses the plurality of information to suggest a prioritized list of pertinent contacts to a user of the mobile communication device.

\* \* \* \* \*